United States Patent [19]

Sundberg et al.

[11] 4,042,436
[45] Aug. 16, 1977

[54] METHODS AND APPARATUS FOR PRODUCING SHEATHS FOR BATTERY ELECTRODES

[75] Inventors: Erik Sundberg, Yardley, Pa.; Erik Westberg, Lidingo, Sweden

[73] Assignee: Aktiebolaget Tudor, Sundbyberg, Sweden

[21] Appl. No.: 752,257

[22] Filed: Dec. 20, 1976

[30] Foreign Application Priority Data

Dec. 23, 1975 Sweden .............................. 7514580

[51] Int. Cl.² .......................... B32B 1/08; H01M 2/02
[52] U.S. Cl. .................................... 156/182; 156/296; 428/36; 428/188; 429/141; 429/238
[58] Field of Search ............... 156/182, 296, 441, 180, 156/52, 166; 429/140, 141, 234, 235, 237, 238; 428/36, 188, 398

[56] References Cited

U.S. PATENT DOCUMENTS

| 2,343,970 | 3/1944 | Galloway | 429/238 |
| 2,747,007 | 5/1956 | Brandt | 429/141 |
| 2,896,006 | 7/1959 | Sundberg | 429/238 |
| 2,972,000 | 2/1961 | Boriolo | 429/140 |
| 2,981,783 | 4/1961 | Bushrod | 429/140 |
| 3,265,535 | 8/1966 | Sundberg | 429/141 |
| 3,266,935 | 8/1966 | Boriolo | 156/198 |

Primary Examiner—Charles E. Van Horn
Assistant Examiner—Michael W. Ball
Attorney, Agent, or Firm—Burns, Doane, Swecker & Mathis

[57] ABSTRACT

Sheaths for covering battery electrodes are produced by introducing inner and outer layers of sheath material onto a plurality of adjacent mandrels. As the layers pass along connector sections of the mandrels, they are connected together to form interconnected tubes. The connector sections have an elongate cross-sectional configuration to facilitate such connection. Thereafter, the layers pass along reshaping sections of the mandrels which have a cross-sectional configuration that is different from that of the connector sections and which corresponds to the desired final shape of the tubes.

12 Claims, 6 Drawing Figures

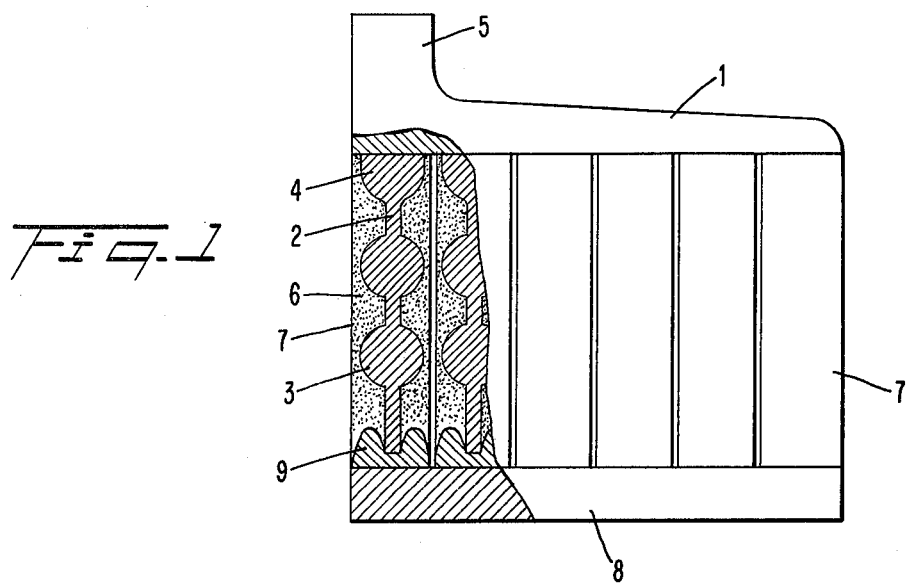
Fig. 1
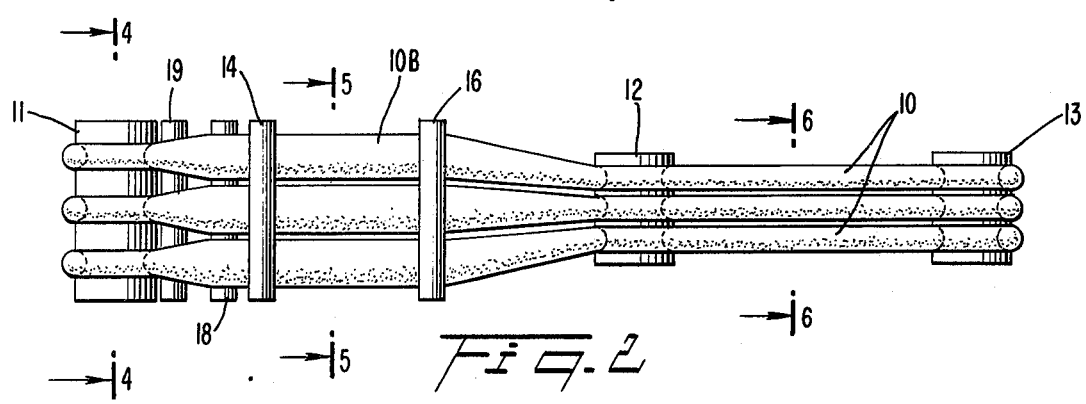
Fig. 2
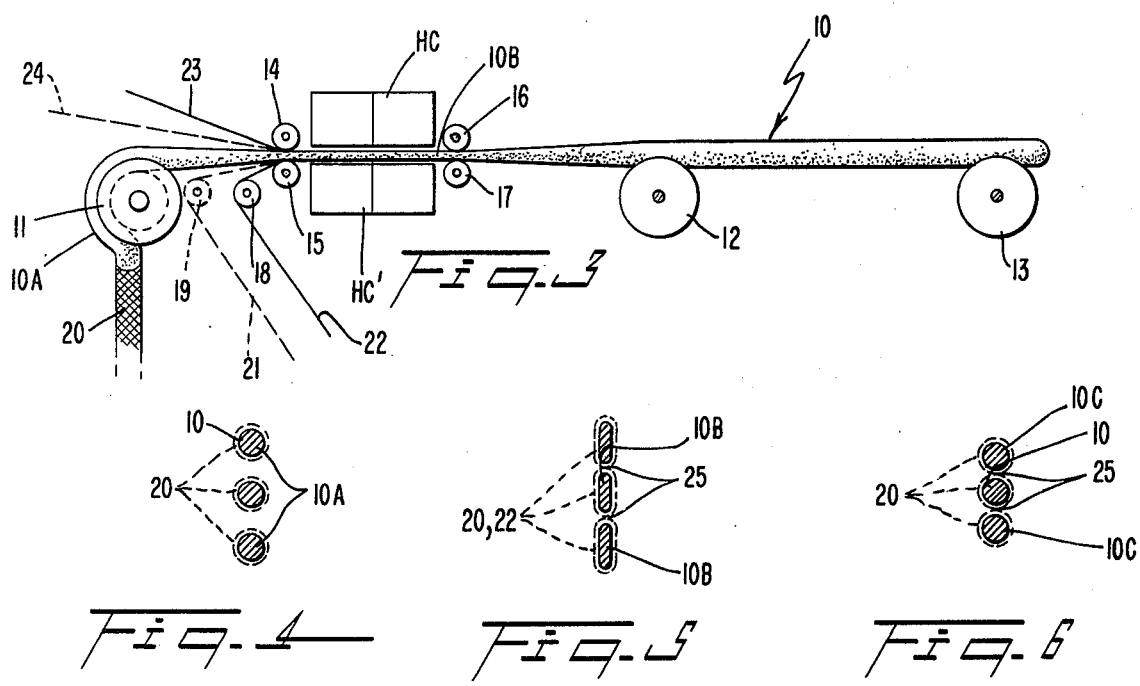
Fig. 3
Fig. 4
Fig. 5
Fig. 6

METHODS AND APPARATUS FOR PRODUCING SHEATHS FOR BATTERY ELECTRODES

BACKGROUND AND OBJECTS

The present invention concerns the manufacture of a type of sheath for tube electrodes used with electrical accumulators or batteries; it comprises two layers. One of the two layers, the actual or inner sheath wall, comprises a layer of fibrous material, preferably glass fiber. The sheaths comprise another layer outside the fibrous material. This other layer is attached to the fibrous material and is intended to give mechanical strength to the sheath. Although the invention can be applied to other areas, it is mainly intended for positive electrodes used with lead accumulators. The following preferred embodiment of the invention therefore is limited to its application in connection with electrodes.

With cycling, i.e., with charging and discharging of accumulator cells, there occurs in the positive electrodes, during discharging, a conversion of the active material from lead dioxide to lead sulphate, and during charging a re-formation of the lead dioxide. This is accompanied by a tendency toward volume changes by the active material. In order to prevent this material from breaking up and losing contact with the accumulator grid in the electrode and from falling out from the electrode, these electrodes have for many years been produced in the form of so-called tube electrodes. This means that the grid is made with a border, a so-called top frame of lead, from which extend a number of parallel rod-shaped conductors or bars. These bars are surrounded separately or in twos by active material which in turn is surrounded by a tube-shaped sheath.

The present invention is intended for the production of such sheaths in which all of the tube sheaths required for an electrode are obtained in the form of a coherent piece.

At the present time sheaths for the tube electrodes are available in three different types. The first and second types comprise single tubes, i.e., the sheath for each tube in the electrode is made separately. Such single tubes are available either with single walls or with double walls. In both types, one begins with glass fiber, usually in the form of a braided sheath, which in the case of single-walled tubes is impregnated so that a suitable stiffness is obtained. In the case of double-walled tubes, the braided sheath is provided with an outer sheath, e.g., one of perforated plastic sheeting.

The third type consists of mats or sheets produced by a weaving technique. In such case, all the tube sheaths necessary for an electrode are contained in one piece. Such sheaths can be woven of modacryl or polyester fiber, and they also contain a certain amount of glass fiber.

In addition to these types, there are also descriptions of double-walled tubes connected in a number corresponding to the number which is required for the completed electrode. Such tube sheaths are described in Swedish patent applications Nos. 7316973 and 7300175. The method and apparatus of the present invention makes possible the production of these and other types of tube sheaths under technically and economically favorable conditions.

It is, therefore, an object of the present invention to provide a novel electrode sheath for batteries.

It is another object of the invention to provide methods and apparatus which facilitate the production of battery electrode sheaths.

BRIEF SUMMARY

According to the invention, production is carried out by combining two sheath materials as they are conveyed over a number of mandrels, Each tube in the completed sheath is associated with a mandrel, and these mandrels each include a connector section with a cross-sectional configuration which is elongate. Preferably the configuration is that generally of an ellipse with flattened sides so that this section of each mandrel is bandshaped or tape-shaped, with the mandrel sections being co-planar. This arrangement facilitates the joining portions of the tube together into one unitary piece as they travel along these sections of the tube.

The downstream section of each mandrel is then altered in cross-section so that it corresponds to the desired final form of the product, whereby the distance between mandrels situated adjacent to each other is constant along both of the afore-mentioned sections of the mandrels.

By bringing together the two portions and uniting them on the bandlike sections of the mandrels, one greatly facilitates the obtainment of a good connection between the two sheath layers. At the same time, the method and apparatus according to the invention makes possible the application of a large number of different materials and material combinations.

THE DRAWING

The invention will now be described in greater detail in connection with a preferred embodiment illustrated in the accompanying figures wherein:

FIG. 1 shows a tube electrode which can be provided with a sheath according to the invention;

FIG. 2 is a plan view of an arrangement for the execution of the method according to the invention;

FIG. 3 is a side elevational view of the apparatus of FIG. 2; and

FIGS. 4–6 are cross-sectional views through sheath-carrying mandrels employed at different places in the apparatus, in accordance with lines A—A, B—B, and C—C, respectively, in FIG. 2.

DETAILED DESCRIPTION OF A PREFERRED EMBODIMENT OF THE INVENTION

As mentioned before, an electrode tube is formed around a grid with a top frame 1 and bars 2. On the top frame there is also a so-called flag or vane 5. Nearest the top frame the bars include a thickened section 4, intended to provide location for the tube sheaths. The bars can also be provided with fins 3, intended to center the bars in the tube sheaths. All these details belonging to the grid are formed of a piece of lead-base alloy adapted to this purpose. The bars are surrounded by active material 6 and tube sheaths 7. The tubes are closed by a bottom strip 8, which is also provided with devices 9 for location of the tube sheath and bar. The bottom strip is made of polyethylene.

The apparatus shown in FIGS. 2 and 3 has three mandrels 10. The number of mandrels must conform to the number of tubes in the tube electrode and usually varies between 10 and 20. The essential construction of the apparatus, however, is not changed by any variation in the number of mandrels. The mandrels rest on three supporting rolls 11, 12, 13, which are provided with guide grooves. All of the supporting rolls can be provided with driving gears, not shown in the figure. There are also present cylinders 14, 15, 16, 17, intended to guide the sheath material toward the mandrels and possibly exercise pressure on the material in the direction of the mandrels. Supporting rolls 18, 19 can also be used to guide sheath material onto the mandrel.

The apparatus shown in the figure can be used for the production of a sheath with different material combinations. If one starts out from braided tubes made of glass fiber which are to form the inner, fibrous layer in the sheath wall, an inlet end 10A of the mandrel, shaped like a crutch, receives each such layer 20. The feeding or threading of the inner layer material over the mandrels is carried out by having the cylinder 11 driven in clockwise direction by a motor. The outer sheath layer, which may consist of perforated plastic sheeting or netting made of plastic material, is applied as bands intended to cover the entire electrode surface. These bands 22, 23 are held against the mandrels and on the threaded layer 20 with the help of cylinders 14, 15.

Farther on in the direction of the movement there also takes place a compression of the tube and band materials with the help of the cylinders 16, 17. With this material combination, there takes place the connecting of the two materials with each other through heating, so that the plastic material melts or fuses into the glass along the longitudinal partition lines between the tubular portion of the sheath. This heating as well as the following cooling off must occur in the section between the pair of cylinders 14, 15 and 16, 17. This can be accomplished by conventional heating and cooling units HC, HC'.

Importantly, during this step the cross-sectional configuration of the connector sections 10B of the mandrel is elongate, as depicted in FIG. 5. This configuration has been found to greatly facilitate the fusing together of the opposed surfaces and edges of the sheath materials to define individual pockets within the unitary electrode tubing, which pockets will surround an associated electrode. The sheath layers have been interconnected by high quality joints as a result of this technique.

Preferably, the sections 10B are in the general shape of an ellipse with flattened sides so as to be band-shaped.

Then there takes place a change in the cross-sectional shape of the mandrels to form a re-shaping section 10C of the mandrel so that after the passage of the supporting roller 12 they have a cross-section that corresponds to the one desired for the finished product. The re-shaping section 10C of the mandrels which is present in the zone between the cylinders 12 and 13 is intended for the final formation of the product, and this can take place, for example, through a careful heating of the sheath in this zone, so that the plastic material softens and then is re-cooled.

After the sheaths have left the mandrels, the cutting to the desired length is carried out.

Another possibility is that the outer sheath material consists of a fabric of woven polyester fiber. The two layers of material can then be combined by means of a binding agent in the form of thermosetting resin or by having one or the other sheath material provided with a coating of thermoplastic material which is melted and thus combines the two sheath layers.

Another possibility is to apply an initial layer which comprises totally of relatively wide bands or tapes rather than a tube. This fibrous material can comprise non-woven mats or sheets of glass fiber 21, 24 as depicted in phantom in FIG. 3. In this case, the mandrel can be attached in another way than with the crutch shown in the figure, and the propulsion of the sheath material can be carried out with the help of the cylinder 12 or the supporting rollers 14, 15.

In FIGS. 4-6 are shown the different cross-sections of the mandrels which are used in the above example. In these figures material in the form of braided tubing has been indicated by broken lines. As shown in FIG. 4, the initial mandrel sections 10A have a suitably circular cross-section. In the production of certain sheath types, however, this section of the mandrel can be unnecessary and is replaced with another form of guide. Essential for the invention, on the other hand, is section 10B, where the mandrels have the form of bands or tapes. These bands must have as little thickness as possible, and their total circumference must correspond to the circumference of the mandrel in that part where the forming of the material takes place. Through the shaping of the mandrels shown in FIG. 5 it is made possible that the sheath materials have large, even contact surfaces at the stage when they are to be connected with one another, wherefore a good union between the materials can easily be achieved. Then occurs a transition to the cross-section which is desired for the finished product, an example of circular mandrels being shown in FIG. 6.

It is essential that the distance between the mandrels is substantially constant during mainly the whole time that the sheath materials pass along sections 10B and 10C. By distance is not necessarily meant the distance between center axes but the free distance between two adjacent materials which would tend to rupture the connecting joints.

Certain difficulties in uniting the materials may arise in the longitudinal dividing or joining line between two separate tubes. It has therefore been found advantageous to introduce threads 25 in each space between two adjacent mandrels, which threads become encased within the sheath layers as they are fused together along longitudinal joining lines. These threads or wires can comprise any appropriate material. If to resist a tensile stress is an essential quality of these threads, then it may be advisable to make them of glass fiber. If their main function is to unite different material layers with one another, the threads may comprise a net or perforated film of thermoplastic material, which is melted in the production process, so that the desired connection is obtained. It can also contribute to uniting the outer layers on both sides of the tube sheath. These threads 25 are indicated in FIGS. 5-6. The threads may comprise different materials; they can be made, for example, of intertwined thermoplastic fibers and glass fibers.

It should be noted that in the event that it becomes desirable to produce sheaths of elongate cross-sectional configuration, then the sections of the mandrels downstream of the sections 10B will have substantially the same elongate shape as the sections 10B (rather than being circular). In that case, a cross-sectional view taken along line C—C in FIG. 2 will appear essentially as shown in FIG. 5.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A method for producing interconnected, multi-layer sheaths for electrodes of electrical batteries comprising:

introducing an inner layer of fibrous material around a plurality of adjacent mandrels;

introducing an outer layer of material around the inner layer;

passing the inner and outer layers along connector sections of said mandrels having elongate cross-sectional configurations;

connecting said inner and outer layes together and bonding sheaths on adjacent mandrels while on the elongate cross-sectional configuration sections of the mandrels to form interconnected tubes and thereafter passing the connected inner and outer layers along re-shaping sections of the mandrels having a different cross-sectional configuration than that of said connector sections to reshape the sheaths to the desired final cross-sectional configuration of said sheaths.

2. A method according to claim 1 wherein said step of introducing an inner layer comprises introducing a material of braided glass fiber.

3. A method according to claim 1 wherein said step of introducing an outer layer comprises introducing a net or perforated film of thermoplastic material.

4. A method according to claim 1 wherein said step of introducing an outer layer comprises introducing a fabric of woven polyester fiber.

5. A method according to claim 1 wherein said connecting step comprises joining the portions of the layers on one side of the sheath with the portions of the layers on the opposite side of the sheath along the longitudinal partition lines between the tubular portions of the sheath.

6. A method according to claim 1 wherein said step of passing the inner and outer layers along said connector sections comprises passing the inner and outer layers along connector sections having a cross-sectional configuration in the shape of an ellipse with flattened sides.

7. A method according to claim 1 including the step of introducing threads into the longitudinal joining spaces between adjacent sheaths and embedding said threads therein.

8. A method according to claim 7 wherein said step of introducing threads comprises introducing glass fiber threads.

9. A method according to claim 7 wherein said step of introducing threads comprises introducing thermoplastic threads.

10. Apparatus for producing multi-layer sheaths for electrodes of electrical batteries, said sheaths being of the type having interconnected tubes, said apparatus comprising:

a plurality of adjacently disposed mandrels over which are introduced inner and outer layers of sheath material to be connected together, said mandrels each including a connector section along which the layers are bonded to form tubes and along which adjacent tubes are bonded and a downstream re-shaping section;

said connector sections having a cross-sectional configuration which is elongate;

said re-shaping sections having a cross-sectional configuration which is different from that of said connector sections to reshape the sheaths to the desired final cross-sectional configuration of said tubes.

11. Apparatus according to claim 10 wherein said elongate cross-section of said connector sections is in the shape of an ellipse with flattened sides.

12. Apparatus according to claim 11 wherein said connector and re-shaping mandrel sections of adjacent mandrels are spaced apart by equal distances.

* * * * *